United States Patent [19]

Endo et al.

[11] 4,345,471
[45] Aug. 24, 1982

[54] TEMPERATURE MEASUREMENT APPARATUS

[75] Inventors: Fumihiro Endo; Toshio Ishikawa; Jun Ozawa; Yuzuru Kamata; Shigeo Shiono, all of Ibaraki, Japan

[73] Assignee: Hitachi, Ltd., Tokyo, Japan

[21] Appl. No.: 148,282

[22] Filed: May 9, 1980

[30] Foreign Application Priority Data

May 21, 1979 [JP] Japan .................................. 54-61453

[51] Int. Cl.³ .............................................. G01K 5/62
[52] U.S. Cl. ..................................... 374/188; 374/161
[58] Field of Search ................. 73/363.1, 363.5, 378.3; 250/231 R, 578; 340/584, 594

[56] References Cited

U.S. PATENT DOCUMENTS 1,181,226  5/1916  Kenyon ............................. 73/368.1
2,021,440 11/1935  Wheeler et al. ................... 73/363.5

FOREIGN PATENT DOCUMENTS 741175 11/1943  Fed. Rep. of Germany ........ 73/350
1523417  2/1969  Fed. Rep. of Germany ..... 73/363.5

Primary Examiner—James J. Gill
Attorney, Agent, or Firm—Craig and Antonelli

[57] ABSTRACT

A light source for forming an optical path extending across a closed vessel and a light receiving unit for receiving light from the light source are disposed outside the closed vessel. A portion to have its temperature measured as lies in the closed vessel is provided with a temperature detecting device which consists of a temperature sensor and a light interceptive plate. The temperature sensor is formed to be downwardly convex by sticking two members of different coefficients of thermal expansion one over the other (the member of the larger coefficient of thermal expansion being arranged over the member of the smaller coefficient of thermal expansion). The light interceptive plate is arranged over the member of the larger coefficient of thermal expansion. When the portion to have its temperature measured has reached a predetermined temperature, the temperature sensor inverts the downwardly convex state into an upwardly convex state. Owing to the inversion of the state of the temperature sensor, the light interceptive plate is turned into the optical path extending across the closed vessel, from outside the same and intercepts part of the light from the light source. Thus, the quantity of the light to be received by the light receiving unit changes, and the temperature of the portion is measured through a light quantity—temperature conversion.

8 Claims, 8 Drawing Figures

TEMPERATURE MEASUREMENT APPARATUS

BACKGROUND OF THE INVENTION

This invention relates to temperature measurement apparatus, and more particularly to apparatus suitable for measuring the temperature of an object optically in a non-contacting manner, the object to have its temperature measured lying within a closed vessel.

As an example of apparatus wherein the temperature of an object to have its temperature measured lies within a closed vessel is measured optically without any contact with the object, there has been known apparatus which measures the temperature of a conductor of a closed bus, such as phase segregating bus for use in a power station etc. (Japanese Patent Application Laid-open Specification No. 52-134785).

This apparatus having been hitherto known is constructed of a light projector which emits a light beam, a bimetal element which is mounted on the conductor of the closed bus and which is deformed in response to the temperature change of the conductor, a shield plate which is mounted on the bimetal element and which shields the light beam incident thereon from the light projector, a light receptor which receives the light beam from the light projector, and a decision unit which decides the temperature state of the conductor of the closed bus from the state of the light beam received by the light receptor. The apparatus turns the shield plate owing to the displacement of the bimetal based on the temperature so as to intercept part of the light beam directed from the light projector to the light receptor, and serves to measure the temperature on the basis of the degree of interception of the light beam.

Since the hitherto known apparatus exploits the fact that the bimetal is displaced continuously and rectilinearly relative to the variation of the temperature, it is suitable for measuring the temperature of the object, such as the conductor of the closed bus, which in itself is not affected by vibrations of mechanical oscillations, an earthquake etc. However, it is unsuitable for measuring the temperature of an object which is susceptible to the vibrations, for example, a switch consisting of stationary members and a movable member and lying within a disconnecting switch arranged between a gas-insulated circuit breaker and a bushing. The reason is as follows. The hitherto known apparatus measures the continuous variation of the displacement of the light beam or the quantity of the light by means of the bimetal which is continuously displaced depending upon the temperature. Therefore, when the vibrations such as mechanical oscillations and earthquakes act on the object, they are transmitted to the shield plate mounted on the bimetal as the displacement of the bimetal attached to the object. Thus, the light quantity which the shield plate intercepts changes resulting in an error in the temperature measurement.

SUMMARY OF THE INVENTION

An object of this invention is to provide temperature measurement apparatus which is immune against vibrations.

Another object of this invention is to provide temperature measurement apparatus which is free from measurement errors ascribable to vibrations.

Still another object of this invention is to provide temperature measurement apparatus which indicates measured temperatures stepwise.

Yet another object of this invention is to provide temperature measurement apparatus which is simple in construction and easy in installation.

The above-mentioned objects of this invention are accomplished by temperature measurement apparatus which comprises light emitting means in the form of an optical path extending across a closed vessel, temperature detecting means disposed on a port whose temperature is to be measured lying within the closed vessel and to have its position relative to the optical path changed in stepped response to the temperature of the part, and light receiving means to receive light from the light emitting means.

In accordance with this invention, the relative position to the optical path extending across the closed vessel is changed in stepped response to the temperature of the part whose temperature is to be measured so as to change the quantity of the light to be received. Therefore, even when that part is subjected to vibrations, the relative position to the optical path and accordingly the quantity of the light to be received are prevented from changing unless a predetermined temperature of the part is detected. Thus, a temperature measurement of high precision is realized.

Other objects, features and effects of this invention than mentioned above will become more apparent from the following description taken with reference to the drawings.

BRIEF DESCRIPTION OF THE DRAWINGS

FIGS. 2A, 2B, and 2C are sectional views of a temperature detecting device 300 shown by a block in FIG. 1, among which FIG. 2B is a sectional view taken along IIB-IIB' in FIG. 2A, FIG. 2C is a sectional view taken along IIC-IIC' in FIG. 2B and FIG. 2A is a sectional view taken along IIA-IIA' in FIG. 2B, FIGS. 3A and 3B are detailed constructional views of a temperature sensor 305 shown in FIG. 2A.

DETAILED DESCRIPTION OF THE PREFERRED EMBODIMENTS

Figure 1:
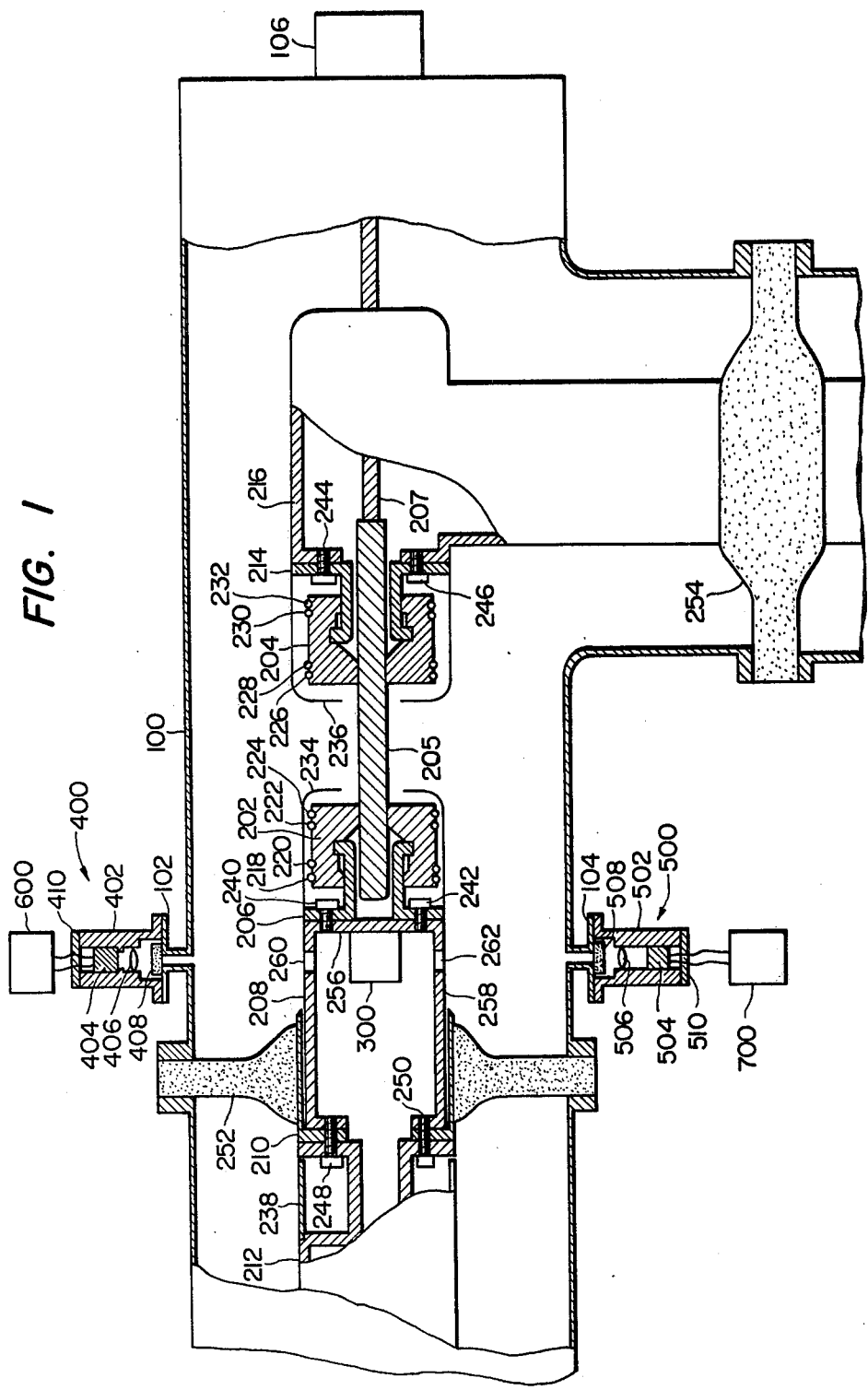
FIG. 1 is a partially sectional view of an embodiment in which temperature measurement apparatus according to this invention is applied to the measurement of the temperature of a disconnecting switch.

FIG. 1 shows a partially sectional view of a disconnecting switch to which this invention is applied. The disconnecting switch to which this invention is applied is connected with a bus (not shown) through a bushing (not shown) on one side, and with a gas-insulated circuit breaker (not shown) on the other side. This disconnecting switch is constructed of a closed vessel 100, and a switch 200 which is received in the closed vessel and which includes a movable member and stationary members forming a portion to have its temperature measured.

Temperature measurement apparatus according to this invention comprises a light emitting device 400 which is disposed outside the closed vessel 100 and which serves to form an optical path extending across the closed vessel 100, a light receiving device 500 which is also disposed outside the closed vessel 100 and which serves to receive light from the light emitting device 400, and a temperature detecting device 300 which is disposed on the switch 200 located within the closed vessel 100 and which has its position relative to the optical path changed in stepped response to the temperature of the switch 200, so as to change stepwise the quantity of the light to be received by the light receiving device 500. The light emitting device 400 includes a power supply 600, while the light receiving device 500 includes a discriminator 700 which discriminates the temperature of the switch 200 in response to the output thereof.

The closed vessel 100 of the disconnecting switch to which this invention is applied has flange portions 102 and 104. The light emitting device 400 and the light receiving device 500 which constitute this invention are respectively mounted on the flange portions 102 and 104.

The switch 200 constituting the disconnecting switch to which this invention is applied includes the first and second stationary members 202 and 204, the movable member 205 which is arranged in a manner to penetrate through the first and second stationary members 202 and 204 and which is supported by these first and second stationary members 202 and 204 so as to establish the conductive state with them during conduction, a stationary member adaptor 208 which is connected with the first stationary member 202 through a first stationary member holder 206 for holding the first stationary member 202, a first high voltage conductor 212 which is connected with the stationary member adaptor 208 through spacer fittings 210, and a second high voltage conductor 216 which is connected with the second stationary member 204 through a second stationary member holder 214 for holding the second stationary member 204.

One end of the movable member 205 is inserted in the first stationary member holder 206, while the other end is connected through a plunger 207 with an operating unit 106 disposed outside the closed vessel 100. The operating unit 106 receives therein a linkage (not shown) for disengaging the movable member 205 from the first stationary member 202 manually or electromagnetically in case of changing-over circuits.

The first and second stationary members 202 and 204 are clamped in the radial direction by springs 218, 220, 222 and 224 and ones 226, 228, 230 and 232 arranged on their outer peripheries, respectively, to be brought into close contact with the movable member 205. Also, the first and second stationary members 202 and 204 are respectively shielded by first and second shield plates 234 and 236 disposed in a manner to cover their outer peripheries. The first high voltage conductor 212 is shielded by a third shield plate 238.

The first stationary member holder 206 and the stationary member adaptor 208 are fixed to each other by bolts 240 and 242. The second stationary member holder 214 and the second high voltage conductor 216 are fixed to each other by bolts 244 and 246. Similarly, the stationary member adaptor 208 and the first high voltage conductor 212 are fixed to each other through the spacer fittings 210 by bolts 248 and 250.

The side of the first high voltage conductor 212 is connected to the bus through the bushing (not shown), while the side of the second high voltage conductor 216 is connected to the gas-insulated circuit breaker (not shown).

A first spacer 252 is disposed on the stationary member adaptor 208 through the spacer fittings 210 between the first stationary member 202 and the first high voltage conductor 212. On the other hand, a second spacer 254 is disposed between the second high voltage conductor 216 and the gas-insulated circuit breaker not shown.

Figure 2A:
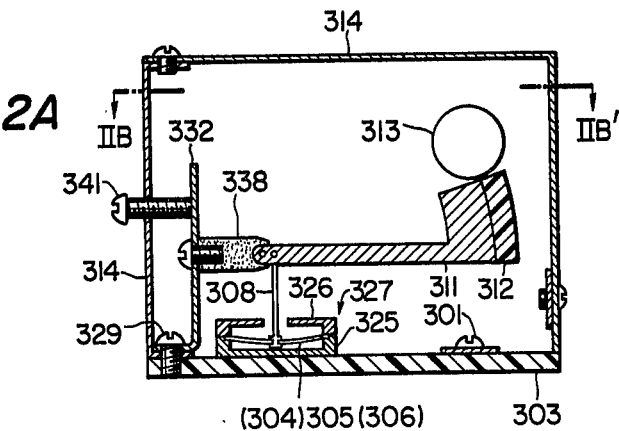
Figure 2C:
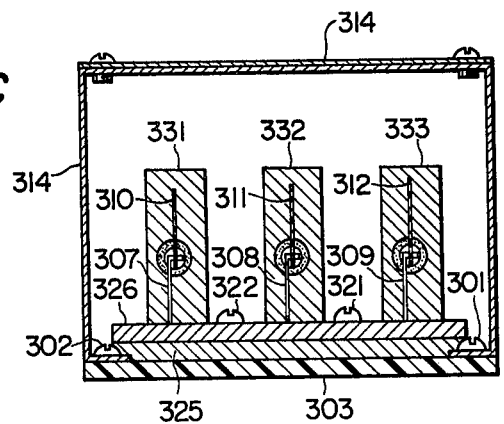
Figure 2B:
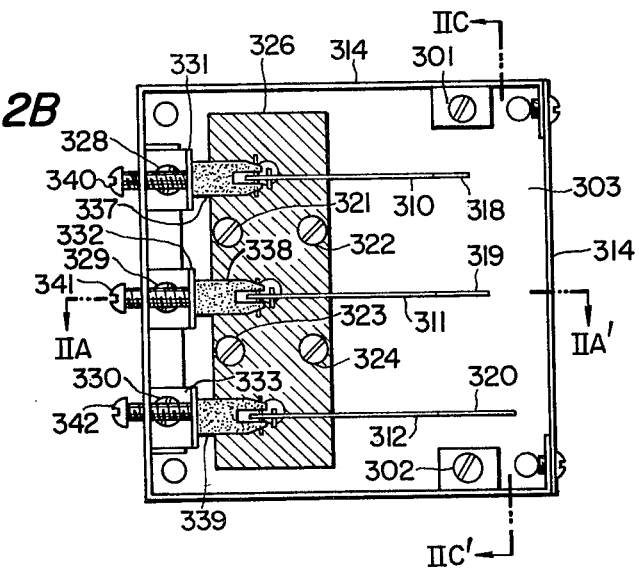

The temperature detecting device 300 constituting this invention is installed on a closed end face 256 within the stationary member adaptor 208 which is fixed to the first stationary member 202 through the first stationary member holder 206 by the bolts 240 and 242, in order to measure the temperature of the switch 200 based on heat which is generated by the contact between the first and second stationary members 202 and 204 and the movable member 205—and which is expressed by the product between the contact resistance and the square of the flowing current. The detailed construction of the temperature detecting device 300 is illustrated in FIGS. 2A, 2B and 2C, and will be particularly described later.

The side surface 258 of the stationary member adaptor 208 extending in the axial direction is provided with light transmitting apertures 260 and 262 so that the light from the light emitting device 400 installed on the flange portion 102 of the closed vessel 100 may pass across the closed vessel 100 via the temperature detecting device 300 and may then be received by the light receiving device 500 installed on the flange portion 104 of the closed vessel 100.

The light emitting device 400 which is fixed to the flange 102 provided on the closed vessel 100 in a manner to extend outwards is constructed of a case 402 which is clamped to the flange 102 with bolts and which intercepts external light, a light emitting element 404 which is accommodated and arranged within the case 402 and which is formed of a light emitting diode, a lens 406 which turns light from the light emitting element into a collimated beam, and a transparent plate 408 which is made of a light transmissive material such as acrylic resin and which keeps the closed vessel 100 airtight and also forms an entrance window for the light from the light emitting element 404. The case 402 is closed up by a lid 410. The light emitting element 404 is connected to the power supply 600 through leads 412 and 414. The power supply 600 is constructed of a known multivibrator which turns the light emitting element 404 "on" and "off" periodically.

Figure 5:
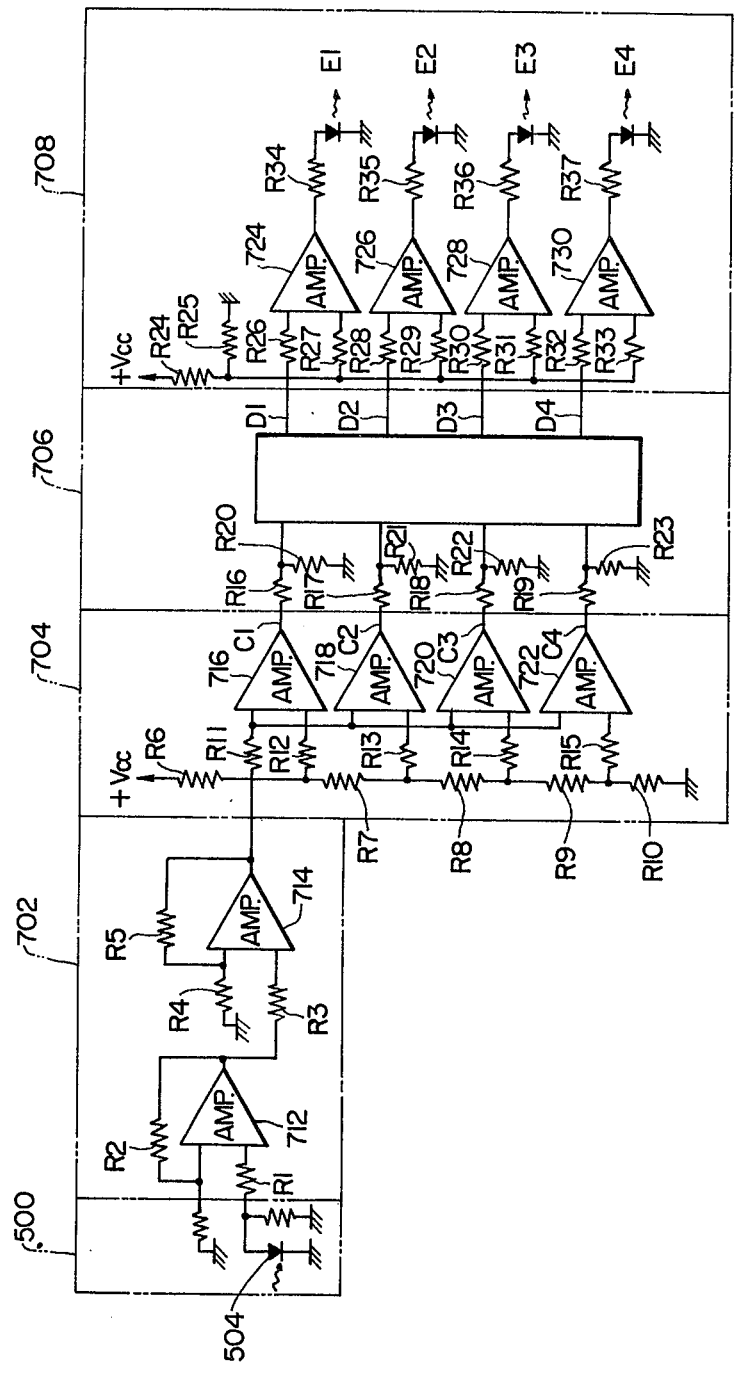
FIG. 5 is a detailed circuit arrangement diagram of a discriminator 700 shown by a block in FIG. 1.

The light receiving device 500 which receives the beam from the light emitting device 400 is fixed to the flange 104 provided on the closed vessel 100 in a manner to extend outwards. The light receiving device 500 is constructed of a case 502 which is fixed to the flange 104 and which intercepts external light, a light receiving element 504 which is formed of a photodiode and which is accommodated and arranged within the case 502 so as to receive the beam from the light emitting device 400, a lens 506 which focuses the beam onto the light receiving element 504, and a light transmitting transparent plate 508 which keeps the closed vessel 100 airtight and also forms an exit window for the light from the light emitting device 400. The case 502 is closed up by a lid 510. The light receiving element 504 is connected to the discriminator 700 to be described later through leads 512 and 514. An example of the concrete arrangement of the discriminator 700 is shown in FIG. 5.

Referring to FIGS. 2A, 2B and 2C, the detailed construction of the temperature detecting device 300 constituting this invention will now be described.

As shown in FIGS. 2A to 2C, the temperature detecting device 300 constituting this invention is composed of first, second and third temperature sensors 304, 305 and 306 (only the temperature sensor 305 appears in FIG. 2A) which are arranged on a base 303 fixed to the closed end face 256 of the stationary member adaptor 208 by screws 301 and 302, in parallel with the optical path to be formed so as to couple the light emitting device 400 and the light receiving device 500, and first, second and third light interceptive plates 310, 311 and 312 which are connected to the corresponding temperature sensors 304, 305 and 306 through first, second and third connecting rods 307, 308 and 309 respectively. They are accommodated and arranged within a case 314 which has a light transmitting aperture 313 adapted to transmit the light from the light emitting device 400 in the direction orthogonal to the optical path.

Figure 3A:
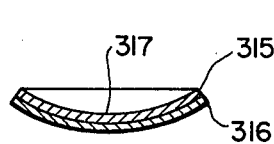

As illustrated in FIG. 3A, each of the first, second and third temperature sensors 304, 305 and 306 is constructed of a first member 315 which is made of a material having a first coefficient of thermal expansion (for example, a Cu-Zn alloy or Fe-Ni-Mn alloy) and which has an arcuate plane, and a second member 316 which is made of a material having a second coefficient of thermal expansion smaller than the first coefficient of thermal expansion (for example, an Fe-Ni alloy) and which has an arcuate plane. The first member 315 and the second member 316 are stuck together one over the other, and unitarily form so as to have a sensor plane 317 which is an arcuate plane being concave in a predetermined direction, for example, in the upward direction. The sensor plane 317 has its state inverted or changes from the upwardly concave state (FIG. 3A) to an upwardly convex state (FIG. 3B) at a predetermined sensing temperature—which is determined by the coefficients of thermal expansion of the first and second members 315 and 316 constituting each of the first, second and third temperature sensors 304, 305 and 306. In the present embodiment, the second temperature sensor 305 is constructed so that the sensing temperature $T_2$ thereof (for example, 100° C.) may become higher than the sensing temperature $T_1$ of the first temperature sensor 304 (for example, 60° C.), and the third temperature sensor 306 is constructed so that the sensing temperature $T_3$ thereof (for example, 125° C.) may become higher than that of the second temperature sensor 305 (refer to FIG. 4).

The second light interceptive plate 311 connected to the second temperature sensor 305 through the second connecting rod 308 is formed so that a light interceptive area 319 thereof opposite to the light transmitting aperture 313 may become larger than one 318 of the first light interceptive plate 310 connected to the first temperature sensor 304 through the first connecting rod 307. Likewise, the third light interceptive plate 312 is formed so that a light interceptive area 320 thereof may become larger than one 319 of the second light interceptive plate 311.

The first, second and third temperature sensors 304, 305 and 306 are preferably constructed as follows. They have the following relationship among the sensing temperatures, in other words, state inverting temperatures $T_1$, $T_2$ and $T_3$ of the first, second and third temperature sensors 304, 305 and 306, and the resetting temperatures $T_1'$, $T_2'$ and $T_3'$ at which the respective temperature sensors return to the original states.

$$T_1' < T_1 < T_2' < T_2 < T_3' < T_3$$

Figure 4:
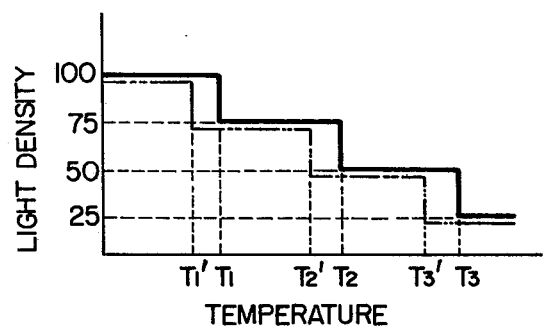
FIG. 4 is a diagram of the temperature characteristics of the temperature sensor shown in FIG. 3A.

By constructing the temperature sensors in this manner, the quantity of the light to be received by the light receiving device 500 becomes as shown in FIG. 4 in which the difference between the quantity of the received light at a temperature rise indicated by a solid line and the quantity of the received light at a temperature fall indicated by a two-dot chain line is very small. This brings forth the advantages that the judgement of the temperature is facilitated and that measurement errors can be made small.

The first, second and third temperature sensors 304, 305 and 306 have their respective ends supported by a supporting case 327 and are accommodated therein in a manner to be downwardly convex. The supporting case 327 consists of a lower case 325 and an upper case 326 which are clamped onto the base 303 by screws 321, 322, 323 and 324. Each of the first, second and third connecting rods 307, 308 and 309 has its one end fixed to the sensor plane of the corresponding one of the first, second and third temperature sensors 304, 305 and 306 and extends upwards perpendicularly to the base 303, and has its other end pivotally supported at the corresponding one of those end parts of the light interceptive plates 310, 311 and 312 which are remote from the light interceptive areas 318, 319 and 320. The end parts of the light interceptive plates 310, 311 and 312 are supported by respective fixed holders 337, 338 and 339 in a manner to be turnable in the direction orthogonally intersecting with the light beam passing through the light transmitting aperture 313. The fixed holders 337, 338 and 339 are respectively fixed by screws 334, 335 and 336 on the free end sides of L-shaped leaf springs 331, 332 and 333 each of which has its one end fixed to the base 303 by the corresponding one of screws 328, 329 and 330 and has its other end set free. The positions of the light intercepting plates 310, 311 and 312 relative to the light transmitting aperture 313 can be respectively adjusted by means of adjusting screws 340, 341 and 342 which are threadably mounted on the case 314 so as to press the free end sides of the corresponding L-shaped leaf springs 331, 332 and 333.

In the above construction, the temperature rise of the switch 200 based on the contact between the stationary member 202 and the movable member 205 constituting this switch 200 is measured as follows by the temperature measurement apparatus according to this invention.

Figure 3B:
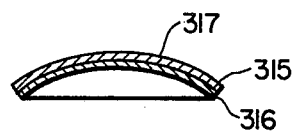

The light from the light emitting device 400 flashed by a flash signal from the power supply 600 arrives at the light receiving device 500 through the transparent plate 408, the window 260 provided in the stationary member adaptor 208, the light transmitting aperture 313 provided in the case 314 of the temperature detecting device 300, the other window 262 of the stationary member adaptor 208 and the transparent plate 508. When the temperature T of the switch 200 has risen upon the contact between the stationary member 202 and the movable member 205 to reach the predetermined value $T_1$, for example, 60° C., the first temperature sensor 304 which inverts its state at the specified temperature inverts the sensor plane 317 from the downwardly convex state as shown in FIG. 3A into the upwardly convex state as shown in FIG. 3B. Owing to the inversion of the sensor plane 317 of the first temperature sensor 304, the connecting rod 307 one end of which is fixed to this sensor plane 317 is displaced upwards and changes the relative position to the light transmitting aperture 313 stepwise. Owing to the stepped upward displacement of the connecting rod 307, the light intercepting plate 310 the end part of which is carried at the other end of the connecting rod 307 is turned about the fixed holder 337 in the direction orthogonally intersecting with the light passing through the light transmitting aperture 313 and so as to reduce the light which is able to pass through the light transmitting aperture 313 by a predetermined amount, for example, 25%. In the light receiving device 500, accordingly, the light quantity reduced 25% from 100% into 75% is received stepwise at the time when the temperature of the switch 200 has reached the predetermined temperature $T_1$ (60° C.) as illustrated in FIG. 4.

Likewise, when the temperature of the switch 200 has further risen to reach the predetermined temperature $T_2$, for example, 100° C., the second temperature sensor 305 inverts its sensor plane 317. The inversion of this sensor plane 317 similarly turns the second light intercepting plate 311, so that the light which is able to pass through the light transmitting aperture 313 is further reduced by a predetermined quantity, for example, 25%.

In the light receiving device 500, accordingly, the light quantity reduced 50% in total from the initial light quantity 100% into 50% is received stepwise at the time when the temperature of the switch 200 has reached the predetermined temperature $T_2$ (100° C.) as illustrated in FIG. 4.

Likewise, when the temperature of the switch 200 has further risen to reach the predetermined point $T_3$, for example, 125° C., the third temperature sensor 306 inverts its sensor plane 317. The inversion of this sensor plane 317 quite similarly turns the third light intercepting plate 312, so that the light to pass through the light transmitting aperture 313 is further reduced a predetermined quantity, for example, 25%.

In the light receiving device 500, accordingly, the light quantity reduced 75% in total from the initial light quantity 100% into 25% is received stepwise at the time when the temperature of the switch 200 has reached the predetermined value $T_3$ (125° C.) as illustrated in FIG. 4.

The light received by the light receiving device 500 is photoelectrically converted, and the temperature is indicated by the discriminator 700 on the basis of its relationship to an output signal corresponding to the received light quantity.

As shown in FIG. 5, the discriminator 700 is constructed of an amplifier circuit 702 which amplifies the output signal of the light receiving device 500 resulting from the photoelectric conversion, a comparator circuit 704 which compares an output signal of the amplifier circuit 702 with predetermined reference signals, a logic circuit 706 which subjects output signals of the comparator circuit 704 to predetermined logic operations, and a display circuit 708 which indicates the temperature on the basis of output signals from the logic circuit 706.

Accordingly, the output signal from the photodiode 504 of the light receiving device 500 is amplified by the amplifier circuit 702 composed of two linear ICs 712 and 714 and is thereafter applied to the comparator circuit 704 composed of four comparators 716, 718, 720 and 722. This comparator circuit 704 carries out a light quantity—temperature conversion, and provides the output signals $C_1$–$C_4$ from the respective comparators in correspondence with the light quantity as listed in Table 1 given below. Since the outputs of the comparator circuit 704 are, so to speak, binary numbers of ON and OFF, they are applied to the logic circuit 706 in order to convert them into a decimal number and to facilitate the temperature indication. The outputs $D_1$–$D_4$ of the logic circuit 706 become as listed in Table 1 in response to the input signals $C_1$–$C_4$ from the comparator circuit 704. The output signals $D_1$–$D_4$ of the logic circuit 706 are respectively applied to four linear ICs 724, 726, 728 and 730 which constitute the display circuit 708. In the display circuit 708, the respective output voltages $D_1$–$D_4$ of the logic circuit 706 and preset comparison voltages are compared by these linear ICs. When the former is smaller than the latter, the corresponding one of light emitting diodes $E_1$–$E_4$ is lit up, and when the converse holds, it is put out. The situation of the lighting-up operations of the light emitting diodes $E_1$–$E_4$ is indicated in Table 1.

As understood from the above description of the embodiment of this invention, the temperature measurement apparatus measures the temperature of the portion to-have-its-temperature-measured in such a way that the temperature detecting device responds stepwise to the temperature by inverting its state when the portion to-be-measured has reached the predetermined temperature and thereby changes the light quantity stepwise. Therefore, even when vibrations act on the portion to-be-measured, any change in the light quantity does not occur unless the temperature of the portion to-be-measured reaches the predetermined point. Consequently, errors of the temperature measurement ascribable to the vibrations are effectively prevented, and the temperature measurement of high precision is realized.

TABLE 1

| Temperature | Outputs of Comparator Circuit | | | | Outputs of Logic Circuit | | | | Display Circuit | | | |
|---|---|---|---|---|---|---|---|---|---|---|---|---|
| | $C_1$ | $C_2$ | $C_3$ | $C_4$ | $D_1$ | $D_2$ | $D_3$ | $D_4$ | $E_1$ | $E_2$ | $E_3$ | $E_4$ |
| <$T_1$ | L | L | L | L | L | H | H | H | 1 | 0 | 0 | 0 |
| $T_1$-$T_2$ | H | L | L | L | H | L | H | H | 0 | 1 | 0 | 0 |
| $T_2$-$T_3$ | H | H | L | L | H | H | L | H | 0 | 0 | 1 | 0 |
| $T_3$< | H | H | H | L | H | H | H | L | 0 | 0 | 0 | 1 |

Here L: low voltage level,
H: high voltage level,
1: lighting up the light emitting diode,
0: putting out the light emitting diode.

Although, in the foregoing embodiment, the light intercepting plates are displaced into the optical path from outside it, an equal effect is achieved even when they are displaced out of the optical path from inside it.

Although the three temperature sensors are employed, the number can be increased or decreased as desired in correspondence with the detection temperatures.

Further, in the discriminator 700, the temperature may well be reported with buzzers or the like instead of lighting up the light emitting diode corresponding to the particular temperature.

We claim:

1. Temperature measurement apparatus for use in measuring the temperature of a member located within a closed vessel, comprising:
   light emitting means to be disposed outside said closed vessel for projecting light along an optical path extending through the interior of said closed vessel, light receiving means to be disposed outside said closed vessel for receiving light from said light emitting means along said optical path, and temperature detecting means to be disposed on said member which is to have its temperature measured for selectively varying the light on said optical path which reaches said light receiving means including means for selectively intercepting the light in said optical path in steps in response to changes in the temperature of said member from one predetermined temperature level to another, thereby changing in a stepwise manner the quantity of the light to be received by said light receiving means, said temperature detecting means including a plurality of temperature sensing means disposed on said member for responding to respective temperature levels of this member in a stepwise manner, and a respective light intercepting means disposed on a respective one of said plural temperature sensing means for changing its position relative to said optical path in response to changes in the temperature level of said member, thereby changing in a stepwise manner the quantity of the light to be received by said light receiving means.

2. Temperature measurement apparatus for use in measuring the temperature of a member located within a closed vessel, comprising:

light emitting means to be disposed outside said closed vessel for projecting light along an optical path extending through the interior of said closed vessel, light receiving means to be disposed outside said closed vessel for receiving light from said light emitting means along said optical path, and temperature detecting means to be disposed on said member which is to have its temperature measured for selectively varying the light on said optical path which reaches said light receiving means including means for selectively intercepting the light in said optical path in steps in response to changes in the temperature of said member from one predetermined temperature level to another, thereby changing in a stepwise manner the quantity of the light to be received by said light receiving means, said temperature detecting means including a plurality of temperature sensing means whose sensing temperatures are different from one another, and the plurality of light intercepting means whose light interceptive areas opposite to said optical path are different in correspondence with the sensing temperatures of said plurality of temperature sensing means.

3. Temperature measurement apparatus according to claim 1 or 2, wherein each of said temperature sensing means detects a temperature change of said member to have its temperature measured, as a change of a state thereof.

4. Temperature measurement apparatus according to claim 1 or 2, wherein each of said temperature sensing means has a sensor plane for detecting the temperature and detects a temperature change of said member, as a change of a convex or concave state of said sensor plane, and each of said light intercepting means is disposed on said sensor plane of said respective temperature sensing means and changes its position relative to said optical path in a direction orthogonal to said optical path in response to the change of said sensor plane.

5. Optical temperature measurement apparatus for use in measuring the temperature of a member located within a closed vessel, comprising:

a light emitting device which is to be disposed outside said closed vessel and which projects light along an optical path extending across said closed vessel, a light receiving device which is to be disposed outside said closed vessel and which receives light from said light emitting device on said optical path extending across said closed vessel, a temperature sensing device which is to be disposed on said member which is to have its temperature measured and which includes at least one bi-state element that inverts its state when the temperature of said member has reached a predetermined value, a light intercepting device which is connected to said temperature sensing device and which changes its position relative to said optical path in response to the state of inverting operation of said temperature sensing device and thereby changes the quantity of the light to be received by said light receiving device, in response to said temperature sensing device, a power supply device which is electrically connected with said light emitting device, and a discriminator device which is electrically connected with said light receiving device and which discriminates the temperature of said member in response to an output of said light receiving device, said temperature sensing device being constructed of a temperature sensor and a supporting element for supporting said temperature sensor, said temperature sensor consisting of a first element which is made of a material having a first coefficient of thermal expansion and which has an arcuate plane and a second element which is made of a material having a second coefficient of thermal expansion smaller than said first coefficient of thermal expansion and which has an arcuate plane, said first element and said second element being stuck together one over the other so as to unitarily form said bi-state element having an arcuate plane, this arcuate plane inverting its orientation at a predetermined temperature, and said light intercepting device is disposed on said arcuate plane of said temperature sensor so as to move into said optical path from outside it or vice versa in response to the inverting operation of said arcuate plane of said temperature sensor, said temperature sensing device comprising first, second and third temperature sensors which are arranged in parallel with said optical path and whose sensing temperature are different from one another, the sensing temperature of said second temperature sensor being higher than that of said first temperature sensor, the sensing temperature of said third temperature sensor being higher than that of said second temperature sensor, and said light intercepting device is constructed of first, second and third light interceptive plates which are respectively disposed on said first, second and third temperature sensors and whose light interceptive areas are different from one another in correspondence with the sensing temperatures of said temperature sensors, the light interceptive area of said second light interceptive plate being larger than that of said first light interceptive plate, the light interceptive area of said third light interceptive plate being larger than that of said second light interceptive plate.

6. Optical temperature measurement apparatus according to claim 5, wherein said temperature sensing device and said light intercepting device are arranged in a receiving case which has a light transmitting aperture for passing the light from said light emitting device, in its wall intersecting orthogonally to said optical path, and said light intercepting device has its position relative to the optical path penetrating said receiving case, by means of an adjusting device disposed on said receiving case.

7. Optical temperature measurement apparatus according to claim 6, wherein said adjusting device is constructed of an L-shaped leaf spring which has its one end fixed to said receiving case and its other end set free, and an adjusting screw which is disposed on said receiving case and which lies in contact with the free end side of said leaf spring, and said light interceptive device is turnably disposed on a holder fixed to said leaf spring and is turned in a direction orthogonal to said optical path through said light transmitting aperture provided in said receiving case, in response to said temperature sensing device.

8. Optical temperature measurement apparatus for use in measuring the temperature of a member located within a closed vessel, comprising:
a light emitting device which is to be disposed outside said closed vessel and which projects light along an optical path extending across said closed vessel,
a light receiving device which is to be disposed outside said closed vessel and which receives light from said light emitting device on said optical path extending across said closed vessel,
a temperature sensing device which is to be disposed on said member which is to have its temperature measured and which includes at least one bi-state element that inverts its state when the temperature of said member has reached a predetermined value,
a light intercepting device which is connected to said temperature sensing device and which changes its position relative to said optical path in response to the state of inverting operation of said temperature sensing device and thereby changes the quantity of the light to be received by said light receiving device, in response to said temperature sensing device,
a power supply device which is electrically connected with said light emitting device, and
a discriminator device which is electrically connected with said light receiving device and which discriminates the temperature of said member in response to an output of said light receiving device,
said discriminator device including an amplifier circuit which amplifies an output signal from said light receiving device, a comparator circuit which compares an output signal from said amplifier circuit with predetermined reference signals, a logic circuit which subjects output signals from said comparator circuit to logic operations, and a display circuit which responds to an output signal of said logic circuit and indicates a temperature corresponding to this output signal.

* * * * *